US012668420B2

(12) United States Patent
Vizzio

(10) Patent No.: US 12,668,420 B2
(45) Date of Patent: Jun. 30, 2026

(54) WASTE BAG HOLDER WITH BACKUP BAG STORAGE

(71) Applicant: Paul Joseph Vizzio, New York, NY (US)

(72) Inventor: Paul Joseph Vizzio, New York, NY (US)

( * ) Notice: Subject to any disclaimer, the term of this patent is extended or adjusted under 35 U.S.C. 154(b) by 0 days.

(21) Appl. No.: 18/661,591

(22) Filed: May 11, 2024

(65) Prior Publication Data

US 2024/0400299 A1 Dec. 5, 2024

Related U.S. Application Data

(60) Provisional application No. 63/470,389, filed on Jun. 1, 2023.

(51) Int. Cl.
*B65F 1/14* (2006.01)

(52) U.S. Cl.
CPC ...... *B65F 1/1426* (2013.01); *B65F 2240/136* (2013.01)

(58) Field of Classification Search
CPC ..... B65F 1/00; B65F 1/1426; B65F 2240/136
USPC .................................................. 220/751, 754
See application file for complete search history.

(56) References Cited

U.S. PATENT DOCUMENTS

| | | | | |
|---|---|---|---|---|
| 5,441,017 | A * | 8/1995 | Lindsay | A01K 27/003 D30/162 |
| 8,544,413 | B1 * | 10/2013 | Gnanendran | B65F 1/141 294/1.4 |
| 10,646,026 | B1 * | 5/2020 | Clementi | E01H 1/1206 |
| 2002/0036206 | A1 * | 3/2002 | Bergman | B65D 25/2829 220/754 |
| 2009/0151645 | A1 * | 6/2009 | Fangsrud | B65F 1/1468 119/161 |
| 2015/0001332 | A1 * | 1/2015 | Qin | B65H 16/005 242/598.3 |
| 2015/0337510 | A1 * | 11/2015 | Feddock | E01H 1/1206 221/34 |
| 2016/0345542 | A1 * | 12/2016 | Becattini, Jr. | B65F 1/0006 |
| 2020/0332485 | A1 * | 10/2020 | Garland | A45F 5/02 |
| 2021/0084866 | A1 * | 3/2021 | Tomlin | A01K 23/00 |
| 2021/0095432 | A1 * | 4/2021 | Stinson | B65F 1/1415 |
| 2021/0227794 | A1 * | 7/2021 | Benoche | B65F 1/1426 |
| 2022/0287275 | A1 * | 9/2022 | Beckham | A45F 3/02 |
| 2022/0356001 | A1 * | 11/2022 | Iles | B65F 1/0006 |
| 2023/0157420 | A1 * | 5/2023 | Sabir | A45C 13/10 24/586.1 |
| 2023/0322478 | A1 * | 10/2023 | Terrell | B65F 1/062 220/495.07 |

* cited by examiner

*Primary Examiner* — Kimberly S Berona
*Assistant Examiner* — Katherine June Walter

(57) ABSTRACT

A dog waste bag dispenser device that includes space for two waste bag rolls. The device includes two axles allowing for bag rolls and allows a user to easily remove a dog waste bag from the dog waste bag rolls. The device includes a plurality of cutouts which allows an attachment strap to connect the device to objects in multiple ways for easy portability. The device includes protrusions allowing for items to be attached using external hooks located on the housing.

1 Claim, 7 Drawing Sheets

WASTE BAG HOLDER WITH BACKUP BAG STORAGE

CROSS REFERENCE TO RELATED APPLICATIONS

This application claims the benefit of U.S. Provisional Application No. 63/470,856, filed on Jun. 3, 2023. The entire teachings of the above applications are incorporated herein by reference.

FIELD OF THE INVENTION

The present invention relates generally to the field of dog waste collection, and more particularly to methods and systems for dog waste bag dispensing.

BACKGROUND

When walking one's pet it is common to bring a device that holds pre-rolled waste bags, such as shown in U.S. Pat. No. 7,850,039B1, in order to pick up one's pet's excrement while on a walk.

The state of the current art is similar to that of U.S. Pat. No. 8,113,381B2, wherein small lightweight devices are added to one's existing leash, but are designed to only hold one roll of waste bags. Though devices such as US20220356001A1 exist to show the roll as a means of estimating the number of bags left, it is very difficult to predict how many bags are left by looking at a roll. Similarly, having to look at the holder and predict the number of bags left is one additional step to have to remember before taking one's pet for a walk.

Oftentimes pets will need to use one or more bags for a walk, especially if one is walking multiple pets. If one's holder has no bags left, or even if there are one or two left, this will leave one in a situation where they will need to pick up the pet's excrement, but have no waste bags left to do so.

While some solutions do exist, they go towards the extreme of full leash organization assemblies, like US20210227794A1, wherein a large bulky assembly is rigidly mounted to an existing leash and contains many features in addition to waste bag storage, like a holding area for treats. For one walking their pet, adding a large clunky device to their leash will oftentimes be a dealbreaker and it would be easier to just grab some bags, treats, and anything else that an organization device would hold and put them in one's pockets.

Therefore, there needs to be a solution to ensure one does not run out of waste bags during a walk with their pet, while remaining small, light, and convenient.

SUMMARY OF THE INVENTION

The present invention can provide an apparatus which attaches to one's existing leash and holds two concurrent waste bag rolls. One waste bag roll is always in-use and is easy to pull bags off one at a time. When the in-use roll is empty, one can easily move on to using the next waste bag roll. The apparatus contains a quick and easy to operate opening mechanism to allow for roll replacement during a walk. The apparatus was designed to work with most waste bag rolls. The apparatus was designed to be as small as possible with minimal empty space to keep it lightweight and of minimal inconvenience to the user. Together, this allows for an apparatus which is lighter, smaller, and more convenient than in the prior art.

The device can include two halves containing space to hold two waste bag rolls. Each half can have small shafts onto which waste bag rolls can rotatably mount onto. The shafts allow for smooth operation of the in-use waste bag roll, along with consistent holding of the spare roll during use.

The device can include a large opening for the in-use waste bag roll. The opening is designed so that one's fingers can fit to pull out the first bag of the roll and for any bags that may get stuck during use. The opening is used to pull bags out of the apparatus one at a time. The device can include an opening for the spare waste bag roll, allowing an easy transition to the next roll.

The device can include a series of loops along the outside such that a strap can be attached to the device, which can then attach to one's existing leash. The device and strap can be configured to one's preference. The device and strap can be attached to a leash to allow for a long hanging application. The device and strap can instead be attached to a leash to allow for a tight hanging application. The device and strap can instead be attached to a leash with multiple points of contact allowing for a secure attachment that will not swing when walking. In particular embodiments this strap can be made of many types of materials such as cloth, leather, synthetic strapping, metal, plastic, rubber, silicone, and other similar materials.

In one embodiment the apparatus is comprised of two clamshells rotatably attached through the use of a hinge and shaft. In other embodiments, the apparatus may use other hinge designs such as a living hinge, a shaft directly on the halves, or other hinge designs known to those in the art. In some embodiments, a spring or similar mechanism can be added to the hinge to help in opening and closing of the apparatus.

In one embodiment the apparatus has a clip to secure the two halves closed. In one embodiment this clip is hidden inside of the device for aesthetic purposes. In other embodiments the clip can be on the outside, of a different size, of a different shape, and include other elements known to those in the art In one embodiment, the two halves are not attached to one another permanently. The halves can be removed from one another and attached together through the use of clips, friction fits, clasps, straps, hooks, or other mechanisms known to those in the art.

In some embodiments, the outer housing can have protrusions that allow for used waste bags to be attached In some embodiments, the parts can be made of rigid materials such as plastics, metals, and composites.

In some embodiments, the parts can be made of a combination of soft and rigid materials such as fabrics, cloth, silicone, and rubber.

BRIEF DESCRIPTION OF DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

A DETAILED DESCRIPTION

Details of some embodiments of the apparatus in the present invention are described below.

Figure 1:
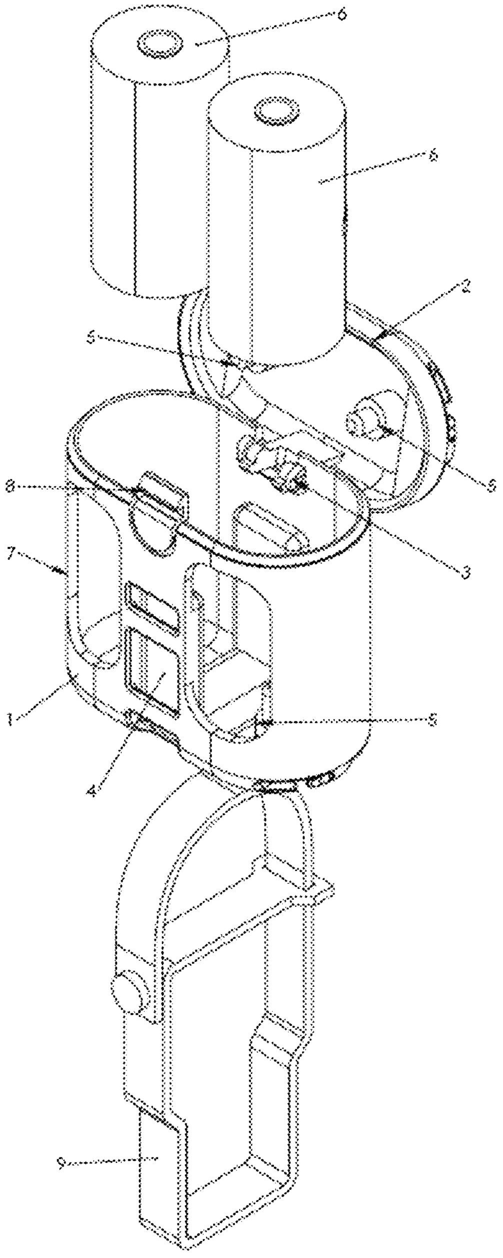
FIG. 1 is an isometric view of an embodiment showing the apparatus opened, ready to load waste bag rolls, and with strap removed

Referring to FIG. 1, in some embodiments of the apparatus there may be a lower clamshell housing 1 rotatably attached to an upper clamshell housing 2 by a cylindrical shaft 3. The lower clamshell housing 1 may have several cutouts 4 that allows for a strap 9 to be routed through. The lower clamshell housing 1 and upper clamshell housing may have shafts 5 that allow two waste bag rolls 6 to be securely housed. In some embodiments the apparatus may have a cutout 7 that allows for the waste bag rolls 6 to be accessed.

Figure 3:
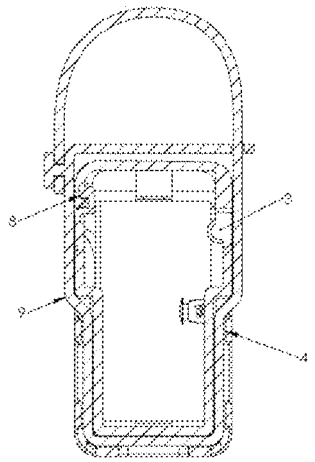
FIG. 3 is a section view of an embodiment
Figure 4:
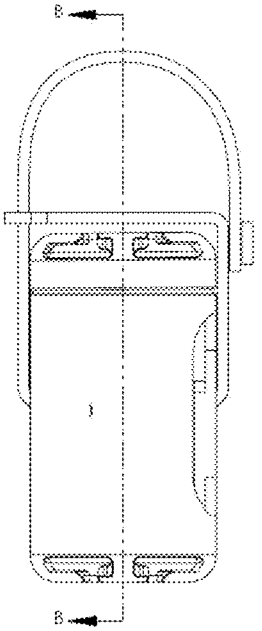
FIG. 4 is a side view of an embodiment with a section line that will be used for FIG. 5
Figure 5:
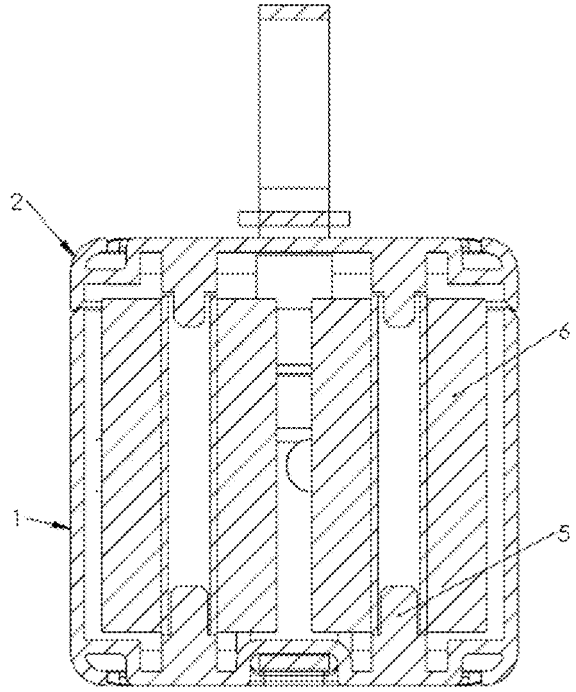
FIG. 5 is a section view of an embodiment

Referring to FIG. 3, in some embodiments the apparatus may have an upper clamshell housing 1 (FIG. 1) rotatably connected through a hinge mechanism 3 to a lower clamshell housing 2 (FIG. 1). In some embodiments the two housings can be secured shut through a clip mechanism 8. In some embodiments there can be a strap 9 routed through cutouts 4 in the housings.

Figure 2:
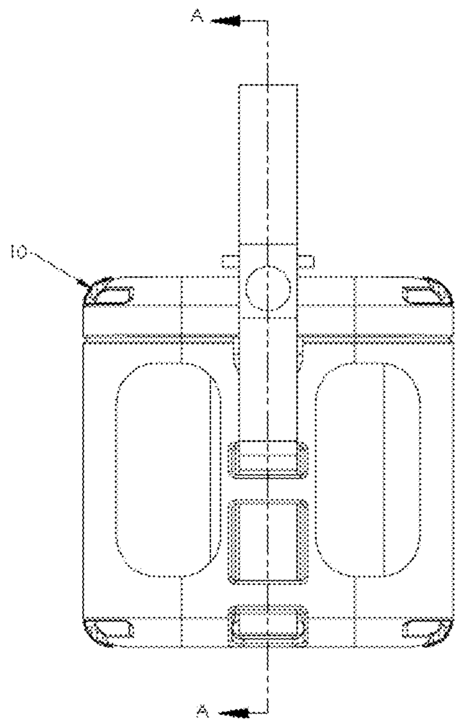
FIG. 2 is a front view of an embodiment with a section line that will be used for FIG. 3

Referring to FIG. 2, in some embodiments there may be a series of hooks 10 that allow for used waste bags to be secured.

Figure 6:
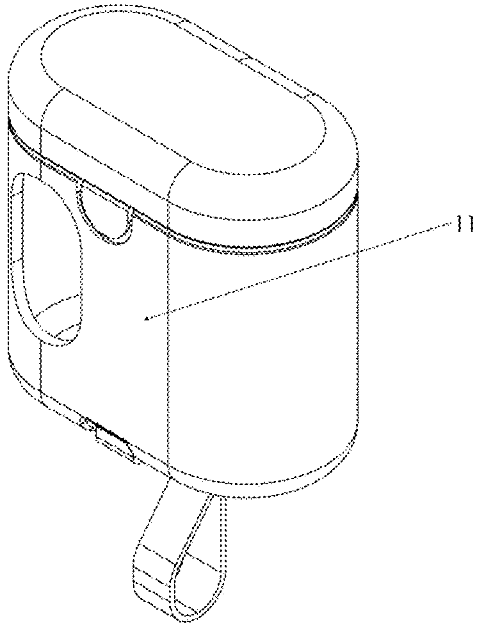
FIG. 6 is an isometric view of an embodiment where the spare waste bags are not accessible during normal use
Figure 7:
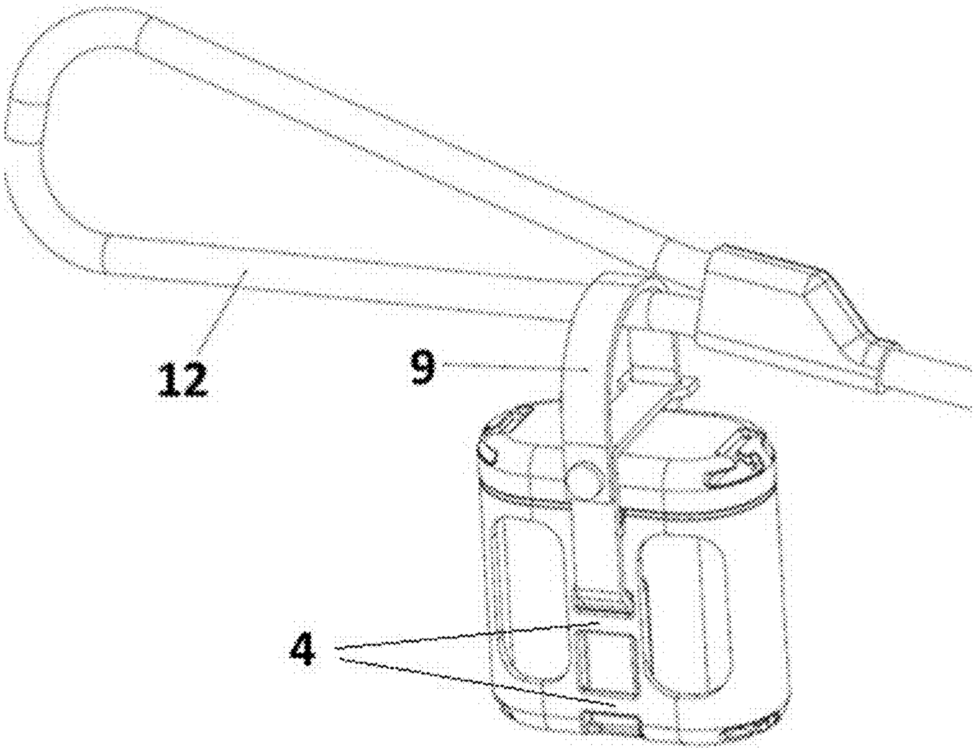
FIG. 7 is an isometric view of an embodiment with a strap that allows for hanging loosely from a leash

Referring to FIG. 6, in some embodiments there may be a covering 11 over the spare waste bags only allowing one roll to be used at a time Referring to FIG. 7, in some embodiments the apparatus may be loosely connected to a leash 12 by routing a strap 9.

Figure 8:
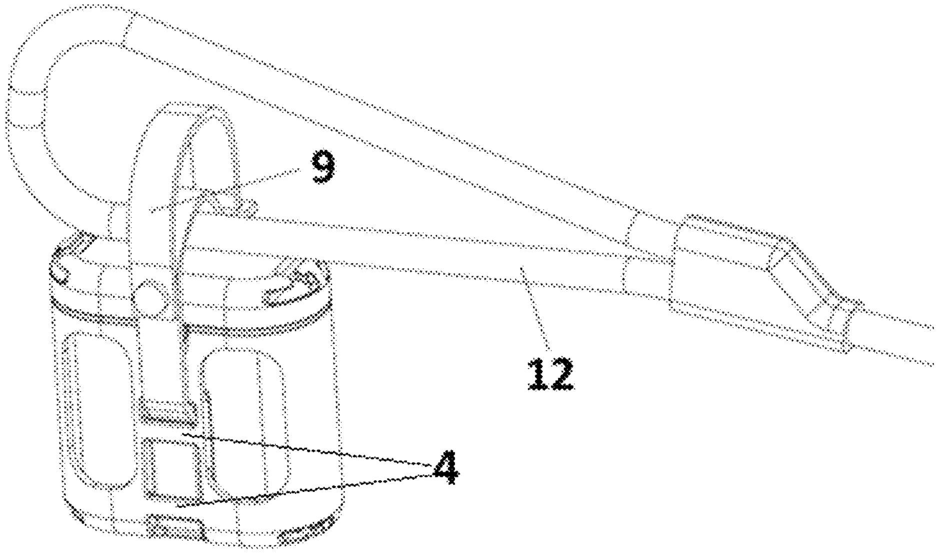
FIG. 8 is a perspective view of an embodiment with a strap that allows for hanging tightly from a leash

Referring to FIG. 8, in some embodiments the apparatus may be tightly connected to a leash 12 by routing a strap 9.

Figure 9:
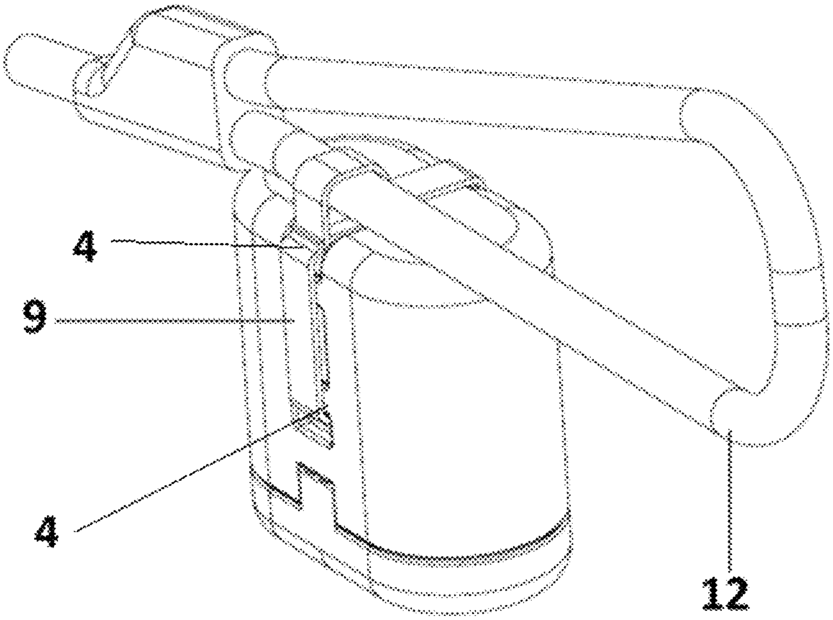
FIG. 9 is a perspective view of an embodiment with a strap that allows for a secure attachment to a leash on the side
Figure 10:
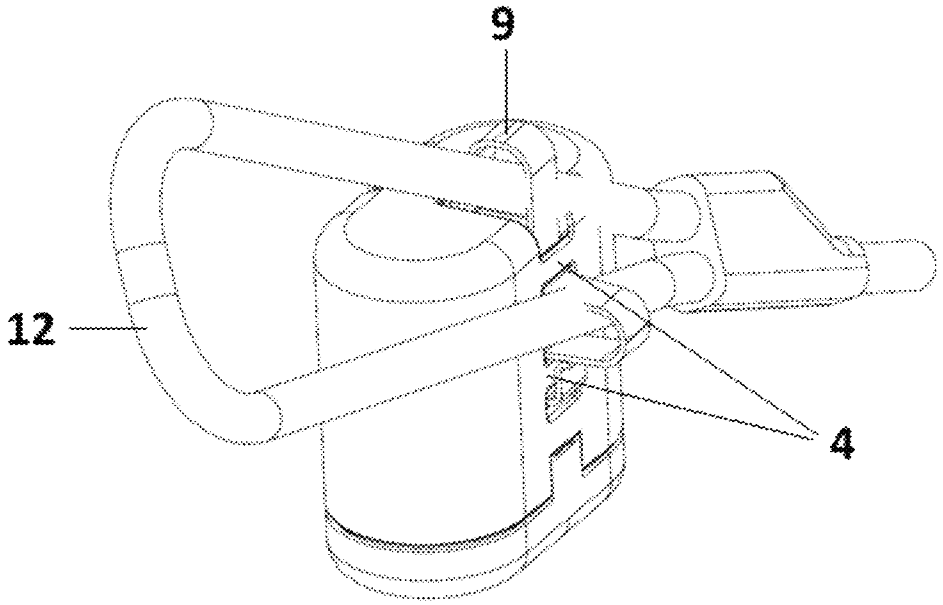
FIG. 10 is a perspective view of an embodiment with a strap that allows for securing the device upside down

Referring to FIG. 9, in some embodiments the apparatus may be securely connected to a leash 12 by routing a strap 9.

Figure 11:
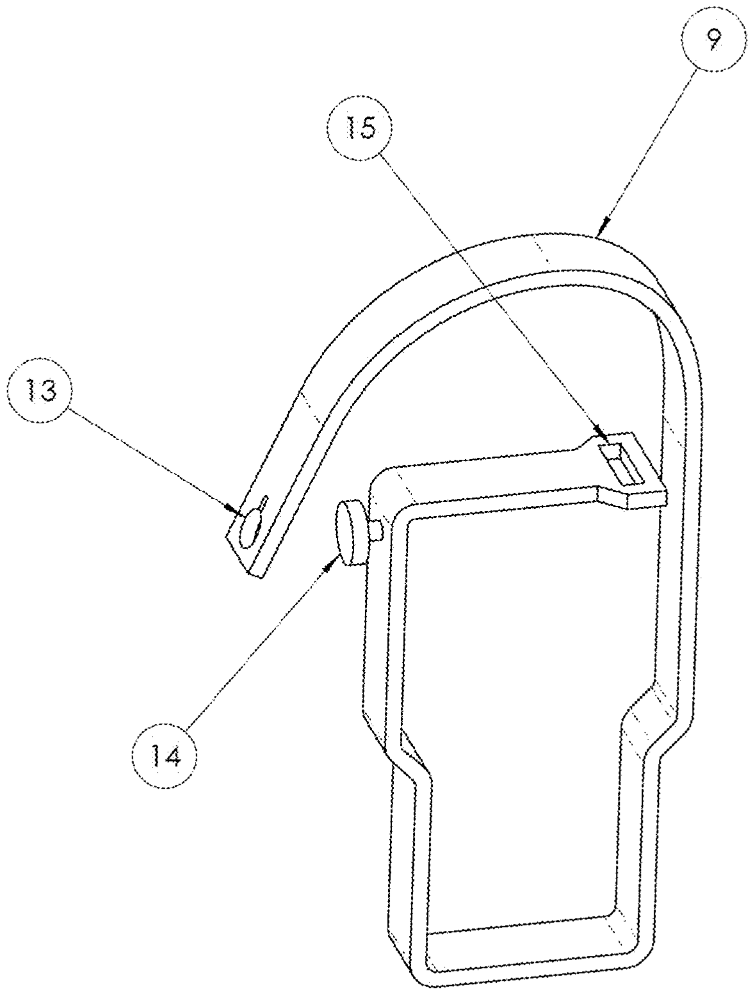
FIG. 11 is a perspective view of an embodiment of the strap

Referring to FIG. 11, the strap 9 has a first end, a second end, and a bottom portion shaped to follow an exterior surface of the housing, wherein the first end has a first slit 15 through which the second end can be threaded, wherein the second end has a second slit 13, and wherein the strap further includes a molded button 14 positioned on the strap 9 between the first end and the second end, such that the second slit is configured to selectively engage the molded button after the second end is threaded through the first slit to thereby form a loop for attachment to the leash.

What is claimed is:

1. A dog waste bag dispenser, comprising:

an internal compartment sized to receive two cylindrical waste bag rolls side-by-side;

a housing formed by two separable clamshell halves configured to open and close along a hinge line;

a first and second axle positioned within the internal compartment and configured to rotatably support the waste bag rolls;

at least one dispensing opening in the housing through which bags from a waste bag roll can be pulled;

a plurality of strap-routing cutouts positioned on the outer surface of the housing, the cutouts configured to receive a strap for mounting the dispenser in a plurality of orientations; and a single piece silicone strap configured to attach the dispenser to a leash or external object, wherein the strap has a first end, a second end, and a bottom portion shaped to follow an exterior surface of the housing, wherein the first end has a first slit through which the second end can be threaded, wherein the second end has a second slit, and wherein the strap further includes a molded button positioned on the strap between the first end and the second end, such that the second slit is configured to selectively engage the molded button after the second end is threaded through the first slit to thereby form a loop for attachment to the leash.

* * * * *